United States Patent
Kelnhofer

(10) Patent No.: US 8,333,078 B2
(45) Date of Patent: Dec. 18, 2012

(54) METHOD AND SYSTEM FOR CONTROLLING AN AIRCRAFT AIR CONDITIONING SYSTEM WITH OPTIMISED FUEL CONSUMPTION

(75) Inventor: Juergen Kelnhofer, Jork (DE)

(73) Assignee: Airbus Operations GmbH, Hamburg (DE)

( * ) Notice: Subject to any disclaimer, the term of this patent is extended or adjusted under 35 U.S.C. 154(b) by 554 days.

(21) Appl. No.: 12/582,850

(22) Filed: Oct. 21, 2009

(65) Prior Publication Data

US 2010/0101251 A1   Apr. 29, 2010

Related U.S. Application Data

(60) Provisional application No. 61/108,665, filed on Oct. 27, 2008.

(30) Foreign Application Priority Data

Oct. 27, 2008  (DE) .......................... 10 2008 053 320

(51) Int. Cl.
*F25B 9/00* (2006.01)
(52) U.S. Cl. ................................ 62/86; 62/239; 62/401
(58) Field of Classification Search ............... 62/133, 62/86, 401, 402, 408, 427, 239; 454/71, 454/76
See application file for complete search history.

(56) References Cited

U.S. PATENT DOCUMENTS

| | | | | |
|---|---|---|---|---|
| 4,263,786 A | * | 4/1981 | Eng | .................... 62/87 |
| 5,299,763 A | * | 4/1994 | Bescoby et al. | ........... 244/118.5 |
| 5,899,085 A | * | 5/1999 | Williams | ......................... 62/236 |
| 5,934,083 A | | 8/1999 | Scherer et al. | |
| 6,283,410 B1 | * | 9/2001 | Thompson | ....................... 244/59 |
| 6,460,353 B2 | * | 10/2002 | Udobot et al. | ..................... 62/86 |
| 6,729,156 B2 | | 5/2004 | Sauterleute et al. | |
| 2004/0172963 A1 | * | 9/2004 | Axe et al. | ........................ 62/401 |

FOREIGN PATENT DOCUMENTS

JP    2001328596    11/2001

OTHER PUBLICATIONS

Article entitled "Einfluss des Leistungsbedarfs von Flugzeugsystemen auf den Kraftstoffverbrauch," by J. Dollmayer, U.B. Carl, Technische Universitat Hamburg, Germany.
English Summary of German language document above, entitled "Influence of the power consumption of airplane systems on the specific fuel consumption."

* cited by examiner

*Primary Examiner* — Mohammad Ali
(74) *Attorney, Agent, or Firm* — Wood, Herron & Evans, LLP

(57) ABSTRACT

In a method for controlling an aircraft air conditioning system, a correlation is established between a plurality of values of a process air mass flow supplied to an air conditioning unit of the aircraft air conditioning system and the fuel consumption of the aircraft. A correlation is also established between a plurality of values of an ambient air mass flow which is used to cool the process air mass flow supplied to the air conditioning unit of the aircraft air conditioning system and the fuel consumption of the aircraft. The process air mass flow and the ambient air mass flow are controlled in dependence on a predetermined cooling capacity of the aircraft air conditioning system such that the fuel consumption of the aircraft is minimized.

10 Claims, 3 Drawing Sheets

METHOD AND SYSTEM FOR CONTROLLING AN AIRCRAFT AIR CONDITIONING SYSTEM WITH OPTIMISED FUEL CONSUMPTION

This application claims priority to U.S. Provisional Patent Application No. 61/108,665, filed on Oct. 27, 2008; and/or German Patent Application No. 102008053320 filed on Oct. 27, 2008.

TECHNICAL FIELD

The invention relates to a method and a system for controlling an aircraft air conditioning system with optimized fuel consumption.

BACKGROUND

So-called air-based air conditioning systems are usually used at present in commercial aircraft to air-condition the aircraft cabin. An aircraft air conditioning system serves to cool the aircraft cabin, which would otherwise be overheated due to thermal loads, such as, e.g. insulation, body heat of the passengers and waste heat from equipment present on board the aircraft. The aircraft air conditioning system in addition adequately supplies fresh air into the aircraft cabin to ensure that a prescribed minimum proportion of oxygen is present in is the aircraft cabin. The structure and the operating principle of an air-based air conditioning system which is commonly used today are illustrated in FIG. 1.

In the aircraft air conditioning system which is shown in FIG. 1 hot process air, which is either bled off the aircraft engines or produced by compressors formed separately from the engines when the aircraft is in flight, is supplied to an air conditioning unit. The process air, which is supplied at a high temperature and under high pressure, is treated in the air conditioning unit upon flowing through a heat exchanger unit as well as a compression and expansion unit such that it leaves the compression and expansion unit as expanded and cooled process air. The expanded and cooled process air is supplied as fresh air to a mixing chamber, where it is mixed with recirculation air removed from the aircraft cabin. The air mixture of fresh air and recirculation air which is produced in the mixing chamber is finally routed into the aircraft cabin, and the mixed air mass flow which is supplied to the aircraft cabin from the mixing chamber should be as constant as possible in order to obtain optimal cabin comfort. Consequently the recirculation air proportion should be increased accordingly when the fresh air proportion of the mixed air is reduced and vice versa. However, when setting the fresh air proportion of the mixed air it is necessary to observe very strict regulations of the aeronautical authorities, which set down in detail the fresh air mass flow to be supplied to an aircraft cabin for different aircraft operating states, for example in accordance with the number of passengers on board the aircraft.

In the heat exchanger unit of the air conditioning unit, which may comprise a plurality of heat exchangers, the hot process air which is supplied to the heat exchanger unit is cooled through the transfer of thermal energy to cold aircraft ambient air flowing through the heat exchanger unit. The aircraft ambient air is supplied to the heat exchanger unit through a ram air inlet duct at a low temperature and under low pressure. After flowing through the heat exchanger unit, the ambient air, which is heated by delivering its cooling energy to the hot process air, leaves the aircraft through a ram air outlet duct.

The greater the quantity of hot process air which must be provided as engine bleed air by the engines of an aircraft, the higher the fuel consumption of the aircraft. An increase in the fuel consumption when there is an increase in the process air mass flow also occurs when using compressors which are formed separately from the engines, as the electrical energy which is required to drive the compressors must be provided by the engines. This correlation is illustrated in the diagram which is represented in FIG. 2. Therefore, in order to minimise the fuel consumption when an aircraft is in flight, the process air mass flow which is supplied to the air conditioning unit should be kept as small as possible.

Given a constant temperature of the recirculation air which is supplied into the mixing chamber of the aircraft air conditioning system from the aircraft cabin, the temperature of the mixed air which is directed into the aircraft cabin from the mixing chamber is determined by the fresh air mass flow which is routed into the mixing chamber as well as the temperature of the fresh air which is fed to the mixing chamber. Therefore, given a reduction in the process air mass flow which is supplied to the air conditioning unit for treatment and a reduction resulting directly therefrom of the fresh air mass flow which is available for supplying into the mixing chamber, with a constant cooling capacity requirement of the aircraft cabin, the temperature of the fresh air which is routed into the mixing chamber must be reduced accordingly if the air mixture which is produced in the mixing chamber of the aircraft air conditioning system is to leave the mixing chamber at a constant low temperature. Decreasing the fresh air temperature to a lower level requires an increase in the cooling capacity of the air conditioning unit.

The cooling capacity of the air conditioning unit is determined by the cooling capacity provided by the compression and expansion unit as well as the cooling capacity provided by the heat exchanger unit. However the maximum cooling capacity which is to be produced by the compression and expansion unit is as a rule limited by the system pressure, i.e. the pressure at which the process air is supplied to the compression and expansion unit by the engines or the compressors formed separately from the engines. An increase in the cooling capacity of the air conditioning unit is therefore in most cases only possible by increasing the cooling capacity which is provided by the heat exchanger unit.

An increase in the cooling capacity which is provided by the heat exchanger unit of the air conditioning unit can be effected by increasing the mass flow of the ambient air which is routed as cooling air through the heat exchanger unit. For this it is necessary to open up larger flow cross sections of the ram air inlet duct and/or the ram air outlet duct, which is usually effected by opening corresponding flaps which control the flow cross sections of the ram air inlet duct and/or the ram air outlet opening. However, on account of the fact that the flaps project out of the aircraft outer skin in the open state, the opening of the flaps controlling the flow cross sections of the ram air inlet duct and/or the ram air outlet duct increases the aerodynamic drag and therefore the fuel consumption of the aircraft. This correlation is illustrated in the diagram which is represented in FIG. 3.

Given a constant cooling capacity requirement of the aircraft cabin, the ambient air mass flow through the heat exchanger unit of the air conditioning unit must be increased all the more as the process air mass flow is reduced in order to compensate for a reduced process air mass flow. In other words, the flaps controlling the flow cross sections of the ram air inlet duct and/or the ram air outlet duct must be brought into an even further open position the less process air is provided for the air conditioning unit by the engines of the aircraft or the compressors formed separately from the engines. On the other hand, the flaps can be closed all the more further as the process air mass flow provided for the air conditioning unit by the engines of the aircraft or the compressors formed separately from the engines increases. This correlation is illustrated in the diagram which is represented in FIG. 4.

To summarise, it can therefore be said that a reduction in the process air mass flow which is bled off the engines of the aircraft or provided by compressors formed separately from the engines does in fact directly enable the fuel consumption of the aircraft to be decreased. However the increase in the ambient air mass flow through the heat exchanger unit of the air conditioning unit which is required to compensate for the reduced process air mass flow when the cooling capacity requirement of the aircraft cabin is constant results in an increase in the fuel consumption of the aircraft.

The object of the invention is to provide a method and a system for controlling an aircraft air conditioning system which enable the fuel consumption of the aircraft to be optimized in different operating situations of the aircraft air conditioning system.

SUMMARY OF THE INVENTION

In order to achieve this object, in a method according to the invention for controlling an aircraft air conditioning system a correlation is established between a plurality of values of a process air mass flow which is supplied to an air conditioning unit of an aircraft air conditioning system and the fuel consumption of the aircraft. The influence of an increase or a reduction in the process air mass flow which is supplied to the air conditioning unit of the aircraft air conditioning system on the fuel consumption of the aircraft can be derived from this correlation. Moreover, in the method according to the invention for controlling an aircraft air conditioning system a correlation between a plurality of values of an ambient air mass flow which is used to cool the process air mass flow which is supplied to the air conditioning unit of the air conditioning system and the fuel consumption of the aircraft is established. The influence of an increase or a reduction in the ambient air mass flow on the fuel consumption of the aircraft is derivable from this correlation.

Finally, the process air mass flow and the ambient air mass flow are controlled in dependence on a predetermined cooling capacity of the aircraft air conditioning system such that the fuel consumption of the aircraft is minimized. In other words, in the method according to the invention for controlling an aircraft air conditioning system both the influence of a variation in the process air mass flow and the influence of a variation in the ambient air mass flow on the fuel consumption of the aircraft are taken into account when controlling the aircraft air conditioning system. By taking both operating variables of the aircraft air conditioning system which influence the fuel consumption of the aircraft into account, when compared with control methods known from the prior art, which only provide for a minimization of the process air mass flow, the method according to the invention for controlling an aircraft air conditioning system enables the fuel consumption entailed by the operation of the aircraft air conditioning system to be minimized in all operating states of the aircraft air conditioning system.

The process air mass flow and the ambient air mass flow can be controlled by means of an electronic control unit. As the logic which is required to control the process air mass flow and the ambient air mass flow is relatively simple, the control function for controlling the process air mass flow and the ambient air mass flow can also be integrated into an existing electronic control unit without any problems. Excess weight and extra costs due to additional equipment can as a result be avoided. The method according to the invention can therefore also be used relatively easily in existing aircraft air conditioning systems.

In the method according to the invention for controlling an aircraft air conditioning system a plurality of pairs of values of the process air mass flow and the ambient air mass flow can be associated with a predetermined cooling capacity of the aircraft air conditioning system, which pairs of values enable the predetermined cooling capacity of the aircraft air conditioning system to be obtained. In other words, a plurality of process air mass flow and ambient air mass flow pairs of values are preferably associated with each predetermined cooling capacity of the aircraft air conditioning system, the process air mass flow value in a pair of values increasing as the ambient air mass flow value of the pair of values decreases. On the other hand, the process air mass flow value of a pair of values decreases as the ambient air mass flow value of the pair of values increases. The described association of pairs of values of the process air mass flow and the ambient air mass flow preferably takes place for each cooling capacity which the aircraft air conditioning system must produce during operation. This then results, for each cooling capacity of the aircraft air conditioning system, in a plurality of combination possibilities for a process air mass flow value and an ambient air mass flow value which enable the cooling capacity to be obtained.

The value of an ambient air mass flow which is associated with a value of a process air mass flow in a pair of values can be determined on the basis of the fresh air temperature upon leaving the air conditioning unit which is required at the value of the process air mass flow in the pair of values to obtain the predetermined cooling capacity of the aircraft air conditioning system. As explained above, in order to maintain a constant cooling capacity of the aircraft air conditioning system, the temperature of the fresh air upon leaving the air conditioning unit must be all the more lower as the process air mass flow which is supplied to the air conditioning unit by the engines of the aircraft or the compressors formed separately from the engines decreases. The ambient air mass flow value which is associated with a process air mass flow value in a pair of values then indicates the ambient air mass flow which is required in order to cool down the process air upon leaving the air conditioning unit to the temperature required to obtain the predetermined cooling capacity of the air conditioning system.

In the method according to the invention for controlling an aircraft air conditioning system when controlling the process air mass flow and the ambient air mass flow the pair of values of the process air mass flow and the ambient air mass flow which enables the fuel consumption of the aircraft to be minimized is preferably selected from the plurality of pairs of values of the process air mass flow and the ambient air mass flow which are associated with a predetermined cooling capacity of the aircraft air conditioning system.

The correlation between the plurality of values of a process air mass flow which is supplied to an air conditioning unit of the aircraft air conditioning system and the fuel consumption of the aircraft can be established, for example, by airborne tests and/or suitable simulations. The correlation between the plurality of values of an ambient air mass flow which is used to cool the process air mass flow which is supplied to the air conditioning unit of the aircraft air conditioning system and the fuel consumption of the aircraft can similarly be established by airborne tests and/or suitable simulations. The correlation between the plurality of values of a process air mass flow which is supplied to an air conditioning unit of the aircraft air conditioning system and the fuel consumption of the aircraft and the correlation between the plurality of values of an ambient air mass flow which is used to cool the process air mass flow which is supplied to the air conditioning unit of the aircraft air conditioning system and the fuel consumption of the aircraft can be formulated in the form of a mathematical equation and stored in a memory of an electronic control unit.

As an alternative to this, tables of values can also be produced and stored in the memory of the electronic control unit, which tables indicate the correlation between the plurality of values of a process air mass flow which is supplied to an air conditioning unit of the aircraft air conditioning system and the fuel consumption of the aircraft and the correlation between the plurality of values of an ambient air mass flow which is used to cool the process air mass flow which is supplied to the air conditioning unit of the aircraft air conditioning system and the fuel consumption of the aircraft.

The ambient air mass flow can be controlled by controlling the flow cross section of a ram air inlet duct accordingly. Alternatively or additionally to this, the ambient air mass flow can also be controlled by controlling the flow cross section of a ram air outlet duct. The flow cross section of the ram air inlet duct can be controlled by means of a ram air inlet duct flap. The flow cross section of the ram air outlet duct can similarly be controlled by means of a ram air outlet duct flap.

A system according to the invention for controlling an aircraft air conditioning system comprises an electronic control unit which is adapted to control, on the basis of a correlation between a plurality of values of a process air mass flow which is supplied to an air conditioning unit of the aircraft air conditioning system and the fuel consumption of the aircraft and on the basis of a correlation between a plurality of values of an ambient air mass flow which is used to cool the process air mass flow which is supplied to the air conditioning unit of the aircraft air conditioning system and the fuel consumption of the aircraft, the process air mass flow and the ambient air mass flow in dependence on a predetermined cooling capacity of the aircraft air conditioning system such that the fuel consumption of the aircraft is minimized. The electronic control unit can be a separate control unit or integrated into an existing control unit.

In the control system according to the invention a plurality of pairs of values of the process air mass flow and the ambient air mass flow can be associated with a predetermined cooling capacity of the aircraft air conditioning system, which pairs of values enable the predetermined cooling capacity of the aircraft air conditioning system to be obtained.

The value of an ambient air mass flow which is associated with a value of a process air mass flow in a pair of values is preferably determined on the basis of the fresh air temperature upon leaving the air conditioning unit which is required with regard to the value of the process air mass flow in the pair of values to obtain the predetermined cooling capacity of the aircraft air conditioning system.

In the system according to the invention for controlling an aircraft air conditioning system the electronic control unit is preferably also adapted, upon controlling the process air mass flow and the ambient air mass flow, to select the pair of values of the process air mass flow and the ambient air mass flow from the plurality of pairs of values of the process air mass flow and the ambient air mass flow associated with a predetermined cooling capacity of the aircraft air conditioning system which enables the fuel consumption of the aircraft to be minimized.

The correlation between the plurality of values of a process air mass flow which is supplied to an air conditioning unit of the aircraft air conditioning system and the fuel consumption of the aircraft can be established by airborne tests and/or suitable simulations and stored in a memory of the electronic control unit in the form of a mathematical equation or a table of values. The correlation between the plurality of values of an ambient air mass flow which is used to cool the process air mass flow which is supplied to the air conditioning unit of the aircraft air conditioning system and the fuel consumption of the aircraft can similarly be established by airborne tests and/or suitable simulations and stored in a memory of the electronic control unit in the form of a mathematical equation or a table of values.

The electronic control unit of the system according to the invention for controlling an aircraft air conditioning system can be adapted to control the ambient air mass flow by controlling the flow cross section of a ram air inlet duct and/or the flow cross section of a ram air outlet duct. A ram air inlet duct flap can be used to control the flow cross section of the ram air inlet duct. A ram air outlet duct flap can be used to control the flow cross section of the ram air outlet duct.

BRIEF DESCRIPTION OF THE DRAWINGS

A preferred embodiment of the invention is now described in detail on the basis of the accompanying schematic drawings, of which.

DETAILED DESCRIPTION

Figure 1:
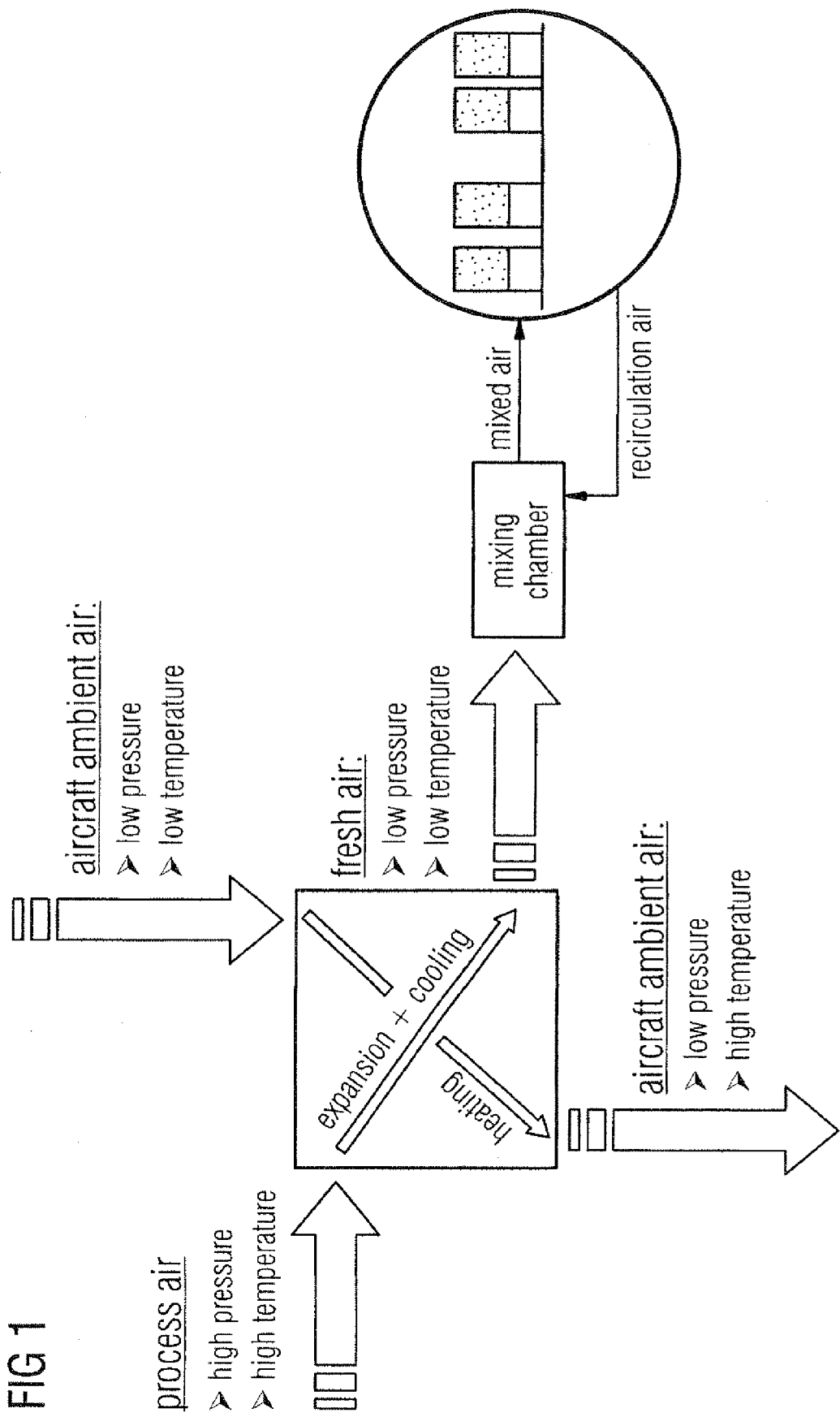
FIG. 1 shows a representation of the structure and the operating principle of a known aircraft air conditioning system.
Figure 2:
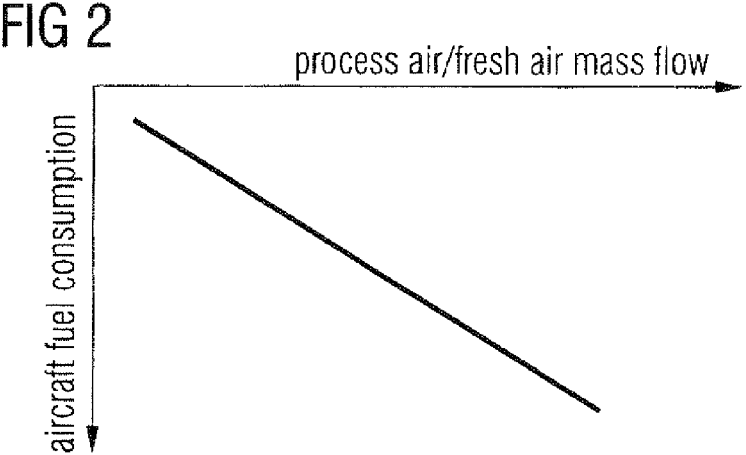
FIG. 2 shows a diagram wherein the correlation between a process air mass flow which is supplied to an air conditioning unit of an aircraft air conditioning system and the fuel consumption of the aircraft is illustrated.
Figure 3:
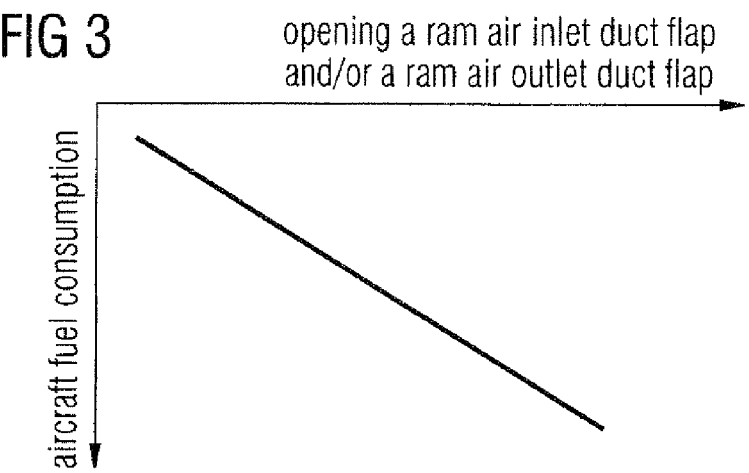
FIG. 3 shows a diagram wherein the correlation between a ram air duct flap position and the fuel consumption of the aircraft is illustrated.
Figure 4:
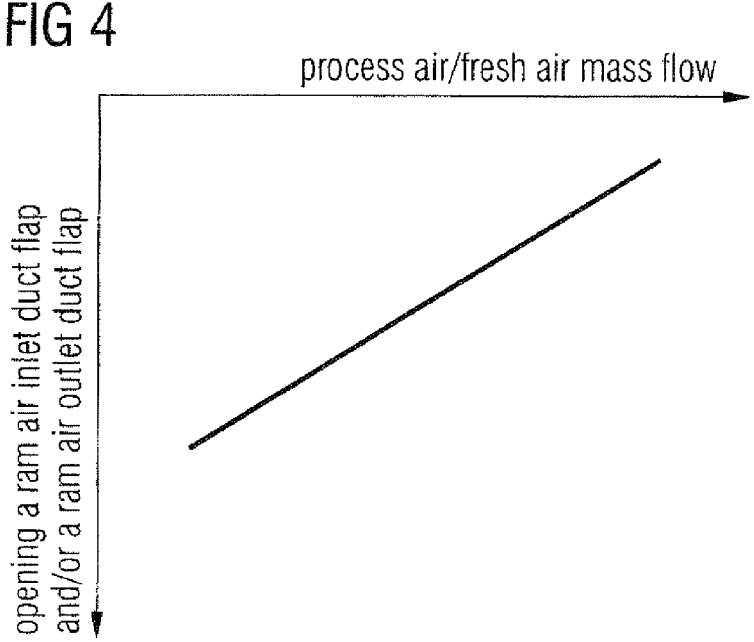
FIG. 4 shows a diagram wherein the correlation between a process air mass flow which is supplied to an air conditioning unit of an aircraft air conditioning system and a ram air duct flap position which is required to obtain a constant cooling capacity of the aircraft air conditioning system is illustrated and FIG. 5 shows an aircraft air conditioning system which is controlled so that the fuel consumption entailed by the operation of the aircraft air conditioning system is minimized.
Figure 5:
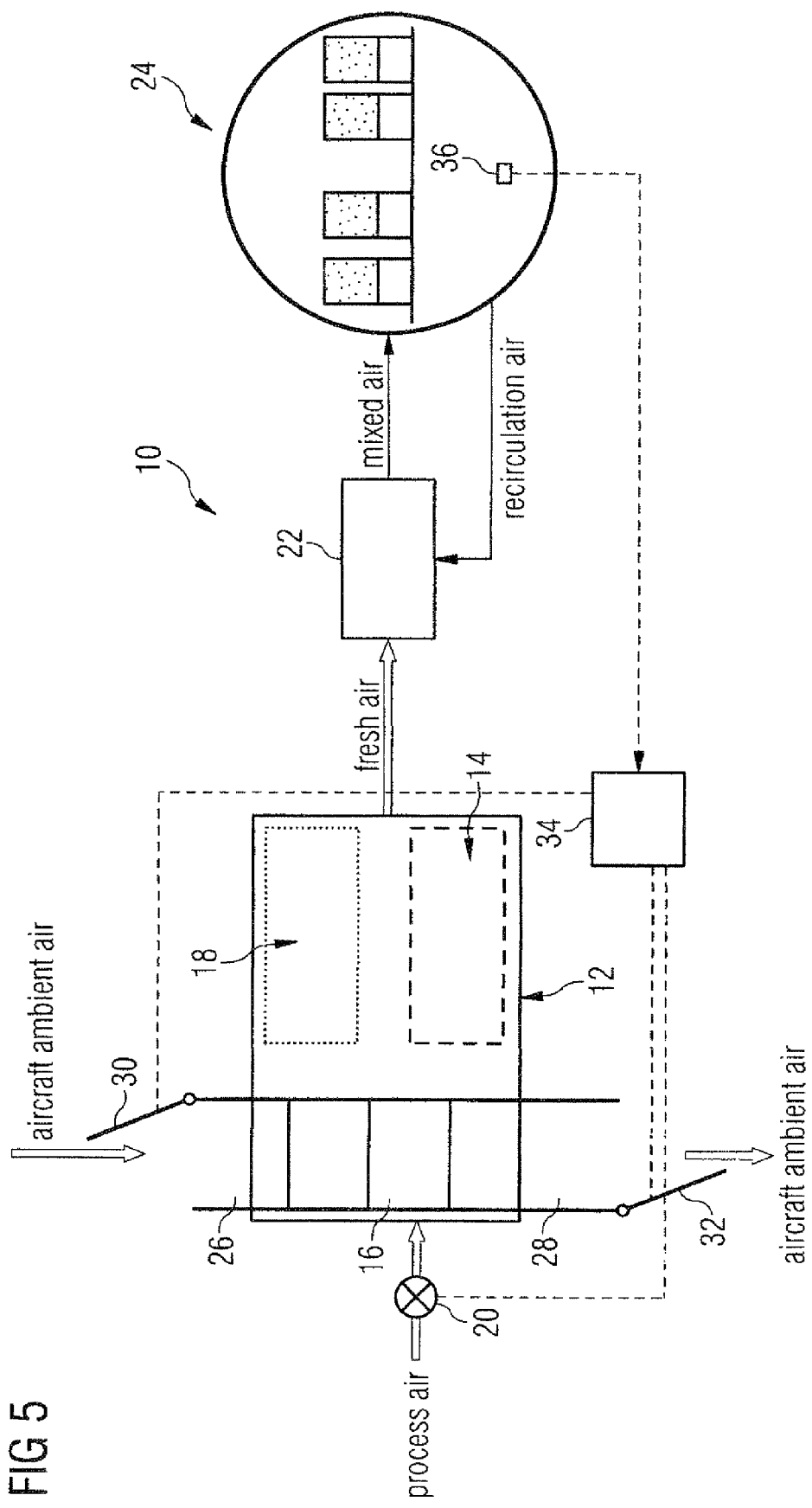

The aircraft air conditioning system 10 which is shown in FIG. 5 comprises an air conditioning unit 12 with a compression and expansion unit 14 as well as a heat exchanger unit 16. The air conditioning unit 12 of the aircraft air conditioning system 10 also comprises a number of different regulating and control valves 18.

Process air which is bled off the engines of the aircraft or produced by compressors formed separately from the engines is supplied to the air conditioning unit 12 of the aircraft air conditioning system 10 at a high temperature and under high pressure. The process air supply into the air conditioning unit 12 is controlled by means of a process air supply regulating system 20. The process air is treated in the air conditioning unit 12 upon flowing through the heat exchanger unit 16 as well as the compression and expansion unit 14 such that it leaves the air conditioning unit 12 as fresh air which is expanded and cooled down to a desired temperature. The fresh air is supplied to a mixing chamber 22, where it is mixed with recirculation air removed from an aircraft cabin 24. The mixing chamber 22 and a recirculation air line connected to the mixing chamber 22 are disposed inside the pressurised fuselage region of the aircraft in most aircraft types. However there are also aircraft types in which the mixing chamber 22 is located outside of the pressurised fuselage region. Finally, the air mixture consisting of fresh air and recirculation air which is produced in the mixing chamber 22 is routed into the aircraft cabin 24.

Aircraft ambient air which is supplied to the heat exchanger unit 16 through a ram air inlet duct 26 disposed upstream of the heat exchanger unit 16, related to the direction of the ambient air stream, is used to cool the process air flowing through the heat exchanger unit 16. The aircraft ambient air is removed from the heat exchanger unit 16 through a ram air outlet duct 28 disposed downstream of the heat exchanger unit 16, related to the direction of the ambient air stream. The flow cross section of the ram air inlet duct 26 is controlled by means of a ram air inlet duct flap 30. The flow cross section of the ram air outlet duct 28 is similarly controlled by means of a ram air outlet flap 32.

An electronic control unit 34 receives signals which are supplied to the electronic control unit 34 by sensors 36 which are disposed in the aircraft cabin 24. Alternatively or additionally to this, the sensors 36 or other sensors can also be disposed in the mixing chamber 22 and therefore inside or outside of the pressurised fuselage region of the aircraft. The signals provided by the sensors 36 can be signals which are characteristic of the temperature in the aircraft air conditioning system, the pressure in the aircraft air conditioning system as well as other parameters. On the basis of the signals which are supplied to it by the sensors 36, the electronic control unit 34 determines the cooling capacity which is to be applied by the aircraft air conditioning system 10 in order to cover the cooling requirement of the aircraft cabin 24.

Given a constant temperature of the recirculation air which is supplied into the mixing chamber 22 of the aircraft air conditioning system 10 from the aircraft cabin 24, the temperature of the mixed air which is directed into the aircraft cabin 24 from the mixing chamber 22 is determined by the fresh air mass flow which is routed into the mixing chamber 22 as well as the temperature of the fresh air which is fed to the mixing chamber 22. A smaller fresh air mass flow can consequently be mixed with a correspondingly increased recirculation air mass flow in the mixing chamber 22 in order to produce mixed air at a constant temperature, provided that the temperature of the fresh air which is supplied to the mixing chamber 22 can be decreased accordingly. Decreasing the temperature of the fresh air which is supplied to the mixing chamber 22 can be achieved by increasing the ambient air mass flow through the heat exchanger unit 16 and the resultant increase in the cooling capacity of the heat exchanger unit 16.

A plurality of pairs of values of the process air mass flow which is supplied to the air conditioning unit 12 and the ambient air mass flow which is routed through the heat exchanger unit 16 are therefore to be associated with each cooling capacity of the aircraft air conditioning system 10 which is required to cover a specific cooling requirement of the aircraft air conditioning system 10. In other words, each cooling capacity of the aircraft air conditioning system 10 can be achieved through a plurality of process air mass flow value and ambient air mass flow value combinations. The ambient air mass flow value which is associated with a process air mass flow value in a pair of values is determined on the basis of the fresh air temperature required at the process air mass flow value of the pair of values in order to obtain a predetermined cooling capacity of the aircraft air conditioning system 10.

The pairs of values of the process air mass flow and the ambient air mass flow which are to be associated with the different cooling capacities of the aircraft air conditioning system are stored in a memory either in the form of a mathematical equation or in the form of tables of values and can be accessed through the electronic control unit 34. The electronic control unit 34 can consequently select, for each cooling capacity of the aircraft air conditioning system 10 which is established by the electronic control unit 34 on the basis of the signals which are supplied to the electronic control unit 34 by the sensors 36, from a plurality of pairs of values of the process air mass flow and the ambient air mass flow which enable this cooling capacity of the aircraft air conditioning system 10 to be obtained.

The more hot process air is provided for the air conditioning unit 12 by the engines of the aircraft or through compressors formed separately from the engines, the higher the fuel consumption of the aircraft. The precise correlation between the process air mass flow which is supplied to the air conditioning unit 12 of the aircraft air conditioning system 10 and the fuel consumption of the aircraft can be established by airborne tests and/or suitable simulations. The correlation between the process air mass flow which is supplied to the air conditioning unit 12 and the fuel consumption of the aircraft, which is established in dependence on the aircraft type and the type of aircraft operation on short- or long-haul routes on the basis of airborne tests and/or suitable simulations, is stored in a memory, which can be accessed by the electronic control unit 34, in the form of a mathematical equation or in the form of tables of values.

An increase in the ambient air mass flow through the heat exchanger unit 16 which is required to increase the cooling capacity of the heat exchanger unit 16 can be effected by opening up larger flow cross sections of the ram air inlet duct 26 and/or the ram air outlet duct 28. However, on account of the fact that the flaps 30, 32 project out of the aircraft outer skin in the open state, and an excess consumption of ambient air mass flow, the opening of the flaps 30, 32 controlling the flow cross sections of the ram air inlet duct 26 and/or the ram air outlet duct 28 increases the aerodynamic drag and therefore the fuel consumption of the aircraft. The precise correlation between the ambient air mass flow which is routed through the heat exchanger unit 16 and the fuel consumption of the aircraft can again be established by airborne tests and/or suitable simulations. The correlation between the ambient air mass flow through the heat exchanger unit 16 and the fuel consumption of the aircraft, which is established by flight tests and/or simulations, is stored in a memory, which can be accessed by the electronic control unit 34, in the form of a mathematical equation or in the form of tables of values.

For a required cooling capacity of the aircraft air conditioning system 10 established by the electronic control unit 34 on the basis of the signals which are supplied to the electronic control unit 34 by the sensors 36, the electronic control unit 34 selects from the pairs of values of the process air mass flow and the ambient air mass flow associated with the required cooling capacity of the aircraft air conditioning system 10, taking account of the correlation between the process air mass flow which is supplied to the air conditioning unit 12 and the fuel consumption of the aircraft as well as the correlation between the ambient air mass flow which is routed through the heat exchanger unit 16 and the fuel consumption of the aircraft, the pair of values of the process air mass flow and the ambient air mass flow which enables the fuel consumption of the aircraft to be minimized. In other words, the electronic control unit 34 takes account not only of the influence of the process air mass flow which is supplied to the air conditioning unit 12 on the fuel consumption of the aircraft, but also of the influence of the ambient air mass flow which is routed through the heat exchanger unit 16 on the fuel consumption of the aircraft. The electronic control unit 34 will consequently select, for each cooling capacity of the aircraft air conditioning system 10, a process air mass flow value which, although it is as low as possible for obtaining fuel savings, is not so low that the reduction in the fuel consumption obtained by decreasing the process air mass flow is smaller than the increase in the fuel consumption which is entailed by the increase in the ambient air mass flow through the heat exchanger unit 16 which is necessary for obtaining the required cooling capacity of the aircraft air conditioning system 10. Therefore the electronic control unit 34 always controls the process air mass flow into the air conditioning unit 12 as well as the ambient air mass flow through the heat exchanger unit 16 so that the fuel consumption of the aircraft is minimized.

The process air mass flow into the air conditioning unit 12 is controlled by means of the electronic control unit 34 by activating the process air supply regulating system 20 accordingly. The ambient air mass flow through the heat exchanger unit 16 is controlled by means of the electronic control unit 34 by activating the ram air inlet duct flap 30 and/or the ram air outlet duct flap 32 accordingly.

The invention claimed is:

1. A method for controlling an aircraft air conditioning system, comprising:
   establishing a correlation between a plurality of values of a process air mass flow supplied to an air conditioning unit of the aircraft air conditioning system; and the fuel consumption of the aircraft,
   establishing a correlation between a plurality of values of an ambient air mass flow which is used to cool the process air mass flow supplied to the air conditioning unit of the aircraft air conditioning system; and the fuel consumption of the aircraft,
   associating a plurality of pairs of values of the process air mass flow and the ambient air mass flow with a predetermined cooling capacity of the aircraft air conditioning system, wherein the plurality of pairs of values enable the predetermined cooling capacity of the aircraft air conditioning system to be obtained, and
   controlling the process air mass flow and the ambient air mass flow in dependence on the predetermined cooling capacity of the aircraft air conditioning system such that the fuel consumption of the aircraft is minimized, wherein controlling the process air mass flow and the ambient air mass flow includes selecting the pair of values of the process air mass flow and the ambient air mass flow which enables the minimized fuel consumption of the aircraft from the plurality of pairs of values of the process air mass flow and the ambient air mass flow which are associated with the predetermined cooling capacity of the aircraft air conditioning system.

2. The method of claim 1, wherein the value of an ambient air mass flow which is associated with a value of a process air mass flow in a pair of values is determined on the basis of the fresh air temperature upon leaving the air conditioning unit which is required at the value of the process air mass flow in the pair of values to obtain the predetermined cooling capacity of the aircraft air conditioning system.

3. The method of claim 1, wherein at least one of the correlation between the plurality of values of a process air mass flow supplied to an air conditioning unit of the aircraft air conditioning system and the fuel consumption of the aircraft the correlation between the plurality of values of an ambient air mass flow which is used to cool the process air mass flow supplied to the air conditioning unit of the aircraft air conditioning system and the fuel consumption of the aircraft is established by at least one of airborne tests suitable simulations.

4. The method of claim 1, wherein the ambient air mass flow is controlled by controlling at least one of the flow cross section of a ram air inlet duct and and/or the flow cross section of a ram air outlet duct.

5. The method of claim 1, further comprising:
   following cooling of the process air mass flow with the ambient air mass flow at the air conditioning unit, directing the process air mass flow to a mixing chamber to be mixed with recirculation air and then to an aircraft cabin, and discharging the ambient air mass flow out of the aircraft through a ram air outlet.

6. A system for controlling an aircraft air conditioning system having an air conditioning unit, the system comprising:
   an electronic control unit which is adapted to establish a correlation between a plurality of values of a process air mass flow supplied to the air conditioning unit of the aircraft air conditioning system and the fuel consumption of the aircraft; establish a correlation between a plurality of values of an ambient air mass flow which is used to cool the process air mass flow supplied to the air conditioning unit of the aircraft air conditioning system and the fuel consumption of the aircraft; associate a plurality of pairs of values of the process air mass flow and the ambient air mass flow with a predetermined cooling capacity of the aircraft air conditioning system, wherein the plurality of pairs of values enable the predetermined cooling capacity of the aircraft air conditioning system to be obtained; and control, on the basis of the correlations of the values of the process air mass flow and the ambient air mass flow to fuel consumption of the aircraft, the process air mass flow and the ambient air mass flow in dependence on the predetermined cooling capacity of the aircraft air conditioning system such that the fuel consumption of the aircraft is minimized,
   wherein the electronic control unit controls the process air mass flow and the ambient air mass flow by selecting the pair of values of the process air mass flow and the ambient air mass flow which enables the minimized fuel consumption of the aircraft from the plurality of pairs of values of the process air mass flow and the ambient air mass flow associated with the predetermined cooling capacity of the aircraft air conditioning system.

7. The system of claim 6, wherein the value of an ambient air mass flow which is associated with a value of a process air mass flow in a pair of values is determined on the basis of the fresh air temperature upon leaving the air conditioning unit which is required at the value of the process air mass flow in the pair of values to obtain the predetermined cooling capacity of the aircraft air conditioning system.

8. The system of claim 6, wherein at least one of the correlation between the plurality of values of a process air mass flow supplied to an air conditioning unit of the aircraft air conditioning system; and the fuel consumption of the aircraft the correlation between the plurality of values of an ambient air mass flow which is used to cool the process air mass flow supplied to the air conditioning unit of the aircraft air conditioning system and the fuel consumption of the aircraft is established by at least one of airborne tests suitable simulations and stored in a memory of the electronic control unit.

9. The system of claim 6, wherein the electronic control unit is adapted to control the ambient air mass flow by controlling at least one of the flow cross section of a ram air inlet duct and the flow cross section of a ram air outlet duct.

10. The system of claim 6, wherein following cooling of the process air mass flow with the ambient air mass flow at the air conditioning unit, the process air mass flow is directed to a mixing chamber to be mixed with recirculation air and then to an aircraft cabin, and the ambient air mass flow is discharged out of the aircraft through a ram air outlet.

* * * * *